(12) United States Patent
LeBaron

(10) Patent No.: US 8,997,637 B2
(45) Date of Patent: Apr. 7, 2015

(54) DUAL BLADDER SYSTEM AND METHOD FOR TREATMENT AND REDUCTION OF MICROBIAL CONTENT IN FLUIDS BY MEANS OF HIGH PRESSURE

(76) Inventor: Elend S. LeBaron, Delta, UT (US)

( * ) Notice: Subject to any disclaimer, the term of this patent is extended or adjusted under 35 U.S.C. 154(b) by 336 days.

(21) Appl. No.: 13/271,618

(22) Filed: Oct. 12, 2011

(65) Prior Publication Data
US 2013/0095225 A1 Apr. 18, 2013

(51) Int. Cl.
*A23L 3/015* (2006.01)
*F17C 13/00* (2006.01)

(52) U.S. Cl.
CPC .................................. *A23L 3/0155* (2013.01)

(58) Field of Classification Search
USPC .......... 99/452, 453, 455, 483; 422/9, 295, 44, 422/45; 604/6.01, 6.11; 137/14; 141/18
See application file for complete search history.

(56) References Cited

U.S. PATENT DOCUMENTS

| | | | | |
|---|---|---|---|---|
| 2,758,747 A * | 8/1956 | Stevens | .......................... | 220/530 |
| 2,853,390 A * | 9/1958 | McGowan et al. | ........... | 426/392 |
| 3,720,230 A * | 3/1973 | Stockstill | ................... | 137/564.5 |
| 3,835,762 A * | 9/1974 | Rambaud | ........................ | 99/483 |
| 3,873,753 A * | 3/1975 | Nelson et al. | ................. | 426/615 |
| 3,895,741 A * | 7/1975 | Nugent | .......................... | 222/103 |
| 4,521,166 A * | 6/1985 | Phillips | .......................... | 417/478 |
| 5,213,029 A * | 5/1993 | Yutaka | ............................ | 99/474 |
| 5,316,745 A * | 5/1994 | Ting et al. | ..................... | 422/295 |
| 5,399,166 A * | 3/1995 | Laing | ............................ | 604/146 |
| 5,492,534 A * | 2/1996 | Athayde et al. | ............... | 604/141 |
| 5,603,360 A * | 2/1997 | Teel | ................................ | 141/21 |
| 5,634,571 A * | 6/1997 | Cataneo et al. | ................. | 222/80 |
| 5,676,180 A * | 10/1997 | Teel | ................................ | 141/18 |
| 5,908,141 A * | 6/1999 | Teel | ................................ | 222/3 |
| 5,975,202 A * | 11/1999 | Grandi | ......................... | 165/48.1 |
| 5,996,478 A * | 12/1999 | Schuman et al. | ............... | 99/453 |
| 6,086,936 A * | 7/2000 | Wilson et al. | ................. | 426/521 |
| 6,331,321 B1* | 12/2001 | Robbins | ......................... | 426/231 |
| 6,527,002 B1* | 3/2003 | Szakaly | .......................... | 137/14 |
| 6,659,128 B2* | 12/2003 | Gilmore | ..................... | 137/564.5 |
| 6,802,981 B2* | 10/2004 | Ryazanova et al. | ........... | 210/726 |
| 7,373,949 B2* | 5/2008 | Park | ......................... | 137/624.18 |
| 8,596,498 B2* | 12/2013 | Werner et al. | ................. | 222/136 |
| 2003/0106478 A1* | 6/2003 | Mears et al. | ..................... | 114/68 |
| 2008/0188333 A1* | 8/2008 | Tsai | .............................. | 473/604 |
| 2008/0233462 A1* | 9/2008 | Curello et al. | .................. | 429/34 |
| 2008/0271245 A1* | 11/2008 | Flick | ................................ | 5/425 |
| 2009/0049617 A1* | 2/2009 | Chaffee | ........................... | 5/706 |
| 2009/0291174 A1* | 11/2009 | Lewis | ........................... | 426/399 |

(Continued)

*Primary Examiner* — Henry Yuen
*Assistant Examiner* — Jimmy Chou
(74) *Attorney, Agent, or Firm* — Thorpe North & Western, LLP

(57) ABSTRACT

A system for treating edible fluids under high pressure to reduce microorganisms. The system comprises a high pressure housing having an interior chamber containing two parallel flexible bladders adapted to hold the fluid to be treated under high pressure within the confines of the chamber. A pressurizing fluid fills the interior chamber outside the bladders. When one bladder is filled the other bladder is collapsed. In operation pressure is exerted throughout the interior chamber by means of the pressurizing fluid for a period sufficient to reduce microorganisms in the fluid within the filled bladder. Pressure will be released and the collapsed bladder will then be filled with an edible fluid causing treated fluid to be removed from the first bladder due to expansion caused by the filling of the second bladder such that the first bladder is collapsed. The process can then be repeated.

5 Claims, 1 Drawing Sheet

(56) References Cited

U.S. PATENT DOCUMENTS

| | | | |
|---|---|---|---|
| 2009/0314354 A1* | 12/2009 | Chaffee | 137/14 |
| 2010/0147871 A1* | 6/2010 | Haas et al. | 222/1 |
| 2010/0193053 A1* | 8/2010 | Sokolov et al. | 137/565.17 |
| 2011/0318463 A1* | 12/2011 | MacGregor et al. | 426/522 |

* cited by examiner

DUAL BLADDER SYSTEM AND METHOD FOR TREATMENT AND REDUCTION OF MICROBIAL CONTENT IN FLUIDS BY MEANS OF HIGH PRESSURE

FIELD OF INVENTION

This invention relates to a system and method for reducing or eliminating microbial content in fluids, particularly edible fluids, by means of high pressure. More particularly this invention relates to a high pressure housing having an interior space which contains dual bladders which can alternately be filled with a fluid to be treated, subjected to high pressure to reduce microbial content and then be drained by means of pressure from the second bladder being filled with fluid to be treated in alternating sequence.

BACKGROUND

Most edible liquids, such as juices from vegetables, fruits, grains and grasses, contain an undesirable microbial content. In the past such liquids have been sterilized or sanitized by means of extreme heat for sustained periods of time, sometimes under pressure, and then cooled. Such heating is done in bulk or after placing in containers, such as cans or bottles. High temperatures can change the chemical composition of such fluids and can also negatively affect the quality and taste of the liquid being processed.

High Pressure Processing (HPP), or Ultra High Pressure (UHP) is a method that has been developed wherein fluids are subjected to elevated pressures, i.e. from about 30,000 psi to 150,000 psi, for a period of time with or without being heated, to minimize, kill or inactivate microbial organisms. HPP inactivates most vegetative microorganisms, including bacteria, yeasts and molds, while allowing treated fluids to retain food quality, freshness and have an extended shelf life. Some bacterial spores can also be treated. HPP processing enables treated fluids to retain the fresh characteristic of food without degradation that is usually caused by thermal treating. In fact, HPP can be conducted under ambient or lower temperature conditions. In that regard HPP is especially suited to treatment of fluids that are subject to thermal degradation even at minimally elevated temperatures.

In the past high temperature processing has been considered essential to kill microbes such as bacteria, viruses, spores, and other single cell pathogens that cause spoilage in foods and food borne disease. However high temperature processing often results in off flavors, protein denaturization, and other nutritional problems.

Moreover, HPP exerts a uniform pressure throughout the pressure device. It is thought to have minimal effect on low molecular weight compounds such as flavors, vitamins, pigments, and the like when compared to thermal treatments.

In general, in an HPP process, the product to be treated is usually in a flexible container, i.e. a plastic bag or bottle and is loaded into a high pressure chamber or container which contains a pressure-transmitting or hydraulic fluid, typically water. The chamber is pressurized by a pump raising the pressure of the pressure-transmitting fluid to the desired range, e.g. 30,000 to 150,000 psi for a predetermined period of time, usually about two to eight minutes. The pressure is transmitted uniformly to the product being treated. The pressure is removed and the product being treated is taken from the chamber for packaging, bottling, or like means and is ready for distribution and/or storage under primarily ambient conditions.

As a net result HPP results in a treated product that has an extended shelf life at ambient or, in some cases, refrigerated temperatures. For example, high acid products, i.e. having a pH of less than about 6.0 may be stored at ambient temperatures whereas some low acid foods such as milk, vegetables, soups and the like, i.e. having a pH of greater than about 7.5 may require some refrigeration to attain an extended shelf life.

SUMMARY OF THE INVENTION

This invention is drawn to a system and method for treating fluids under high pressure to reduce, kill or eliminate microorganisms inclusive of, but not limited to, bacteria, viruses, some spores and perhaps other pathogens.

The system comprises a high pressure housing having an interior chamber or space that contains two flexible bladders which are movably engageable with one another adapted to hold the fluid to be treated under high pressure within the confines of the interior chamber. In other words, these bladders are complimentary adjacent each other such that filling one bladder with a fluid to be treated will cause pressure on the other bladder to be drained assuming appropriate inlet and outlet lines are opened. In that regard, the bladders may be functionally considered as being parallel to each other such that filling one bladder through an open fill line will exert corresponding pressure on the other bladder to expel fluid through an open drain line. To that end, terms such as parallel, complimentary adjacent or moveably engageable may be used interchangeably. Each bladder has a fill inlet line and drain line that pass through and are sealed in housing inlets and extend outside the housing to allow for filling and draining the bladder with treatment fluid. The flow of fluid through the lines is controlled by valves outside the housing that open and shut upon demand as is appropriate. The housing also has a pressure line that extends through a port and is sealed in the housing. The pressure line extends into the housing only a sufficient distance to allow for the introduction of fluid and pressure into the interior chamber surrounding the flexible bladders. Outside the housing this line is connected to a valve that regulates the flow of fluid and pressure into the chamber interior and can which, if desired, be closed to maintain pressurized fluid within the housing. A fluid container and high pressure pump provide for the introduction of fluid under pressure through such valve and inlet into the interior chamber. The pressurization fluid is preferably water but can be any other suitable fluid which is substantially incompressible sufficient to transfer a desired target pressure to the flexible bladders.

The fill lines into each bladder are connected to a fluid reservoir, which, when the inlet valve is opened, can introduce fluid to be treated into and fill the bladder. Conversely, when a bladder is to be drained, the valve on the drain line is opened and fluid which has been subjected to high pressure treatment can be drained, preferably by opening the inlet valve to the fill line of the other bladder which, when being filled with fluid, will exert pressure on the bladder having previously been treated and force treated fluid out the outlet line of that bladder into a receiving receptacle.

In operation, with the bladders in place within the interior chamber, the valve controlling the fill line in the first bladder will open and the fill line to the second bladder and drain lines to both bladders will be closed. The valve controlling the pressure fluid line will also be open. Treatment fluid will be introduced into and fill the first bladder and the valve controlling that line will close. With the valve controlling the pressure line open there may already be pressurizing fluid in the interior chamber and, if not, pressurizing fluid will be pumped from a receptacle under pressure into the interior chamber and around the bladders until the desired pressure, usually between about 30,000 and 150,000 psi had been obtained. The pressure line may be maintained under pressure from the pressurization pump or the valve may close to maintain the pressure within the interior chamber or space for a desired period of time, usually between about two to eight minutes. The pressure within the interior chamber, including the treatment fluid within the bladder, will be uniform throughout. At the end of the treatment period the pressure within the interior chamber will be released through an open pressure line and the valve controlling the drain line of the first bladder will open. The valve controlling the fill line to the second bladder will also open and treatment fluid will enter into the second bladder. During this operation the valves controlling the fill line to the first bladder and drain line of the second bladder will be closed. As the second bladder is filled the pressure being exerted therein will cause treated fluid to flow out of the drain line of the first bladder into a containment receptacle for distribution as desired. When the first bladder has been drained and the second bladder has been filled with treatment fluid the valves controlling the drain line to the first bladder and the fill line to the second bladder will close. Pressurized fluid will again be exerted through the pressure line as above described and the process will be repeated. The bladder filling, pressurizing of treatment fluid within the bladder and draining thereof may alternately be repeated for as long as desired.

BRIEF DESCRIPTION OF THE DRAWINGS

The invention, as presently contemplated, is illustrated by the following drawings which show a preferred embodiment thereof.

DETAILED DESCRIPTION OF THE INVENTION AND THE DRAWINGS

Figure 1A:
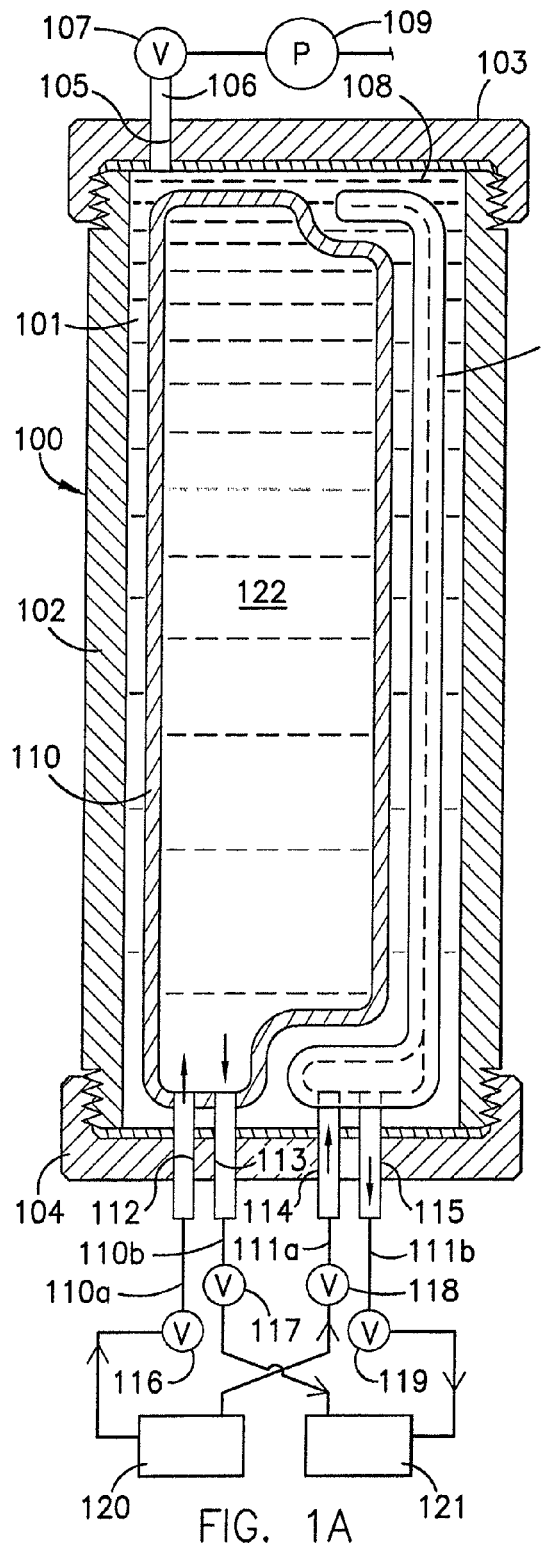
FIG. 1A is a vertical sectional view of a high pressure system with accompanying schematics showing a first bladder in an expanded position and a second bladder in a collapsed position.
Figure 1B:
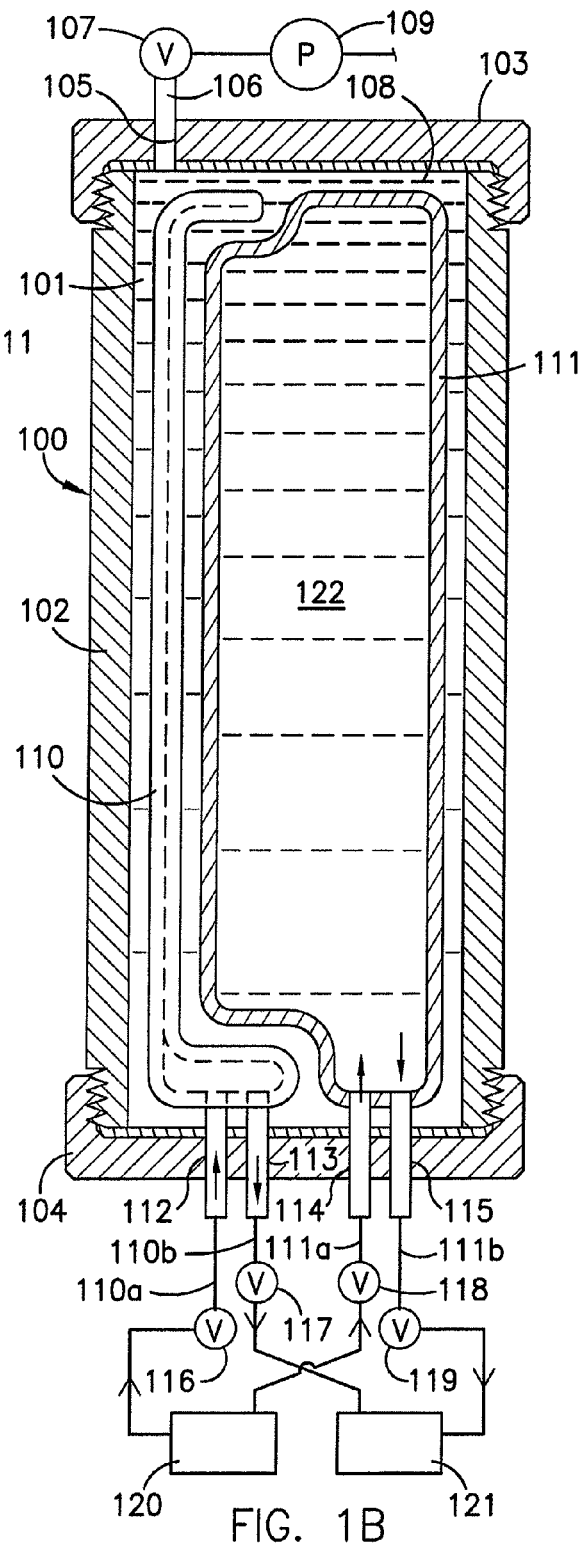
FIG. 1B is a vertical sectional view of the same embodiment in which the first bladder is collapsed and the second bladder is in an expanded position.

Referring now to FIGS. 1A and 1B, the system include a high pressure container 100 having an interior space or chamber 101 defined by a continuous sidewall 102, preferably cylindrical, a sealed top 103 and a sealed bottom 104, said container having sufficient strength to withstand pressures of between about 30,000 to 150,000 psi in the interior chamber 101 thereof. The sealed top 103 and bottom 104 may be secured to the sidewall by bolted flange, threads (as shown), by friction fit or by welding whichever is desired. Each of FIGS. 1A and 1B are identical with the exception that in FIG. 1A, flexible bladder 110 is shown in a filled or expanded position and flexible bladder 111 is shown as being collapsed. Conversely, in FIG. 1B, flexible bladder 111 is shown in a filled or expanded position and flexible bladder 110 is shown as being collapsed. The high pressure container 100 including sidewall and ends may be made of steel, high impact polymeric material or any other suitable materials that can withstand the pressure being exerted and does not interact with any of the contents within the interior chamber. Also, the flexible bladders may be made of any polymeric material, preferably food or medical grade, that will withstand the pressures exerted in the interior chamber and which will not interact with the fluids being treated or the pressurization fluid.

The high pressure container 100 has a port 105 (shown in the top 103), into which is inserted a pressurized fluid line 106 access to which is controlled by a high pressure valve 107 which, when opened allows for the transfer of pressurization fluid 108 into the interior chamber by means of a high pressure pump 109 from a pressurization fluid receptacle (not shown). When pump 109 is operating and/or valve 107 is closed the pressurized fluid 108 is sealed in the interior chamber 101 and maintained at the desired pressure. When the high pressure pump 109 is off and the valve 107 opened the pressure exerted on fluid 108 within the interior chamber will be at essentially ambient conditions.

As noted above, contained within the interior chamber 101 are two side by side or parallel flexible bladders 110 and 111, preferably constructed of food grade polymeric material which is able to withstand high pressures of 30,000 to 150,000 psi. Bladder 110 has an inlet line 110a and an outlet line 110b through which fluids being treated 122 may enter or be removed from bladder 110. Similarly, bladder 111 has an inlet line 111a and an outlet line 111b through which fluids 122 may enter or be removed from bladder 111. The inlet and outlet port lines extend through and are sealed in a fluid tight position in ports 112, 113, 114, and 115 in the sealed bottom 103. Each of lines 110a, 110b, 111a, and 111b are controlled by high pressure valves 116, 117, 118, and 119 which may open or close as desired to allow entry of treatment fluid 122 into, sealing of fluid within, or removal of treated fluid from first and second bladders 110 and 111 as will be explained. The fluids to be treated 122 will be contained in a container 120 and enter the respective first and second bladders 110 and 111 through the respective valves and fill lines as described. Treated fluids from the first bladder 110 and the second bladder 111 will be passed into container 121 through the respective valves and drain lines for storage, filling into containers or dispensers as is desired.

The only limitations as to size or volume of the interior chamber or flexible bladders are those of functionality. Typically each bladder will hold from twenty to forty liters of treatment fluid although greater or lesser volumes may also be used. The operational parameters of the system are limited only by functionality and convenience. It is known in the art that pressures in the range of 30,000 to 150,000 psi will reduce or eliminate pathogens from fluids. However, the system and method as claimed and described here is novel. Further, while preferred pressure ranges of 40,000 to 120,000 psi and most preferred ranges of 50,000 to 100,000 psi may be used in the invention any pressure range, subset of ranges or specific pressures may be utilized in the high pressure treatment of edible fluids to reduce microbial content. Also, the utilization of ambient temperatures in high pressure treatment is also known. Higher or lower temperatures, i.e. from 0 to 100° C. may also be used depending upon the fluid being treated. While higher temperatures may result in a better elimination or kill of pathogens it may also negatively affect the quality, texture and taste of the treated fluid.

The use of the system herein described with the use of dual bladders, the ability to alternately process and drain bladders wherein fluid is being pressurized provides a substantially continuous process heretofore not utilized. To that end, it is again emphasized that the only limitations of volumes, times, temperatures, pressures, and the like are those of functionality.

This invention is particularly adapted to the purification or sterilization of edible vegetative materials, juices, sauces, extracts, syrups, etc. The only limitation again is one of functionality in that the material must be sufficiently low in viscosity under ambient or other operation conditions to flow into and out of the flexible bladders.

In one embodiment, with system 100 assembled as described above, the valve 116 controlling the fill line 110a in bladder 110 will open and the valve 118 controlling fill line 111a to the bladder 111 and valves 117 and 119 controlling drain lines 110b and 111b to both bladders 110 and 111 will be closed. The valve 107 controlling the pressure line 106 will be open and fluid 108 will be pumped from a receptacle (not shown) through pump 109 into the interior chamber 101 and surround filled bladder 110 and collapsed bladder 111. Treatment fluid 122 will be introduced from container 120 through valve 116 and inlet line 110a into and fill bladder 110 and the valve 116 controlling that line will close. As treatment fluid 122 is introduced into bladder 110, fluid 108 in the interior chamber may be forced back through open valve 107 and line 106 into a receptacle. Under this arrangement pressurization fluid 108 in the interior chamber and treatment fluid 122 in bladder 110 will fill the interior chamber 101. With valve 107 open fluid 108 will be pumped through line 106 by means of pump 109 under pressure into the interior chamber 101 until the desired pressure, usually between about 30,000 and 150,000 psi within chamber 101 has been obtained. That pressure in the interior chamber 101 may be maintained by retaining the pressure in line 106 from pump 109 or valve 107 may close to maintain the pressure within the interior space 101 for a desired period of time, usually between about two to ten minutes. The pressure within the interior chamber, including the treatment fluid 122 within the bladder, will be uniform throughout. At the end of the treatment period the pressure within the interior chamber 101 may be released by opening valve 107 and/or turning pump 109 off and allowing pressure to return to ambient and, if necessary any expanded pressured fluid to pass back through an open pressure line 106 and valve 107. There may not be much change in volume of pressurized fluid when pressure is released since water or other fluid will not compress significantly when subjected to high pressures. The valve 117 controlling drain line 110b from bladder 110 will then open to allow fluid 122 to drain into treatment container 121. The valve 118 controlling fill line 111a to bladder 111 will also open and treatment fluid 122 from container 120 will enter into and expand collapsed bladder 111. During this operation the valve 116 controlling the fill line 110a to bladder 110 and valve 119 controlling drain line 111b of bladder 111 will be closed.

As bladder 111 is filled with treatment fluid 122 the pressure being exerted in interior chamber 101 on bladder 110 will cause treated fluid 122 to flow out of the drain line 110b of bladder 110 through open valve 117 and into treatment fluid container 121 for distribution as desired, i.e. in cans, bottles, or other fluid containers. When bladder 110 has been drained and the bladder 111 has been filled with treatment fluid 122 the valves 117 and 118 controlling the drain line 110b to the bladder 110 and fill line 111a to bladder 111 will close. Pressurization will again be exerted within interior chamber 101 by means of pressurized fluid 108 through valve 107 via pump 109 through pressure line 106 as above described and the process will be repeated. The bladder filling, pressurizing of treatment fluid within the bladder and draining thereof may alternately be repeated for as long as desired.

EXAMPLE

One gram samples of carrot juice powder and barley juice grass powder were dissolved in 10 ml of water to form a reconstituted carrot juice and barley juice. These juices were inserted into containers meeting the bladder requirements as described and subjected to high pressures in a closed container essentially as described above. Water was used as the pressurizing fluid and the pressure was exerted under ambient temperature between about three to ten minutes at a pressure of between about 50,000 to 90,000 psi. Following pressurization the treated reconstituted juices were tested for microbial counts, measured in terms of cfu/gm, and compared with an untreated control. Each reconstituted juice was tested for total microbial content, coliform, *E. coli*, yeast and mold. The results shown below in Table 1 are a compilation of five treated tests and a control:

TABLE 1

| All results in are in terms of cfu/gm | | | | | |
|---|---|---|---|---|---|
| | Total* | Coliform | *E. coli* | Yeast | Mold |
| Carrot Juice | | | | | |
| Control | 1.2 | 3,200 | <100 | <100 | <100 |
| Treated | 0.07 | <100 | <100 | <100 | <100 |
| Barley Juice | | | | | |
| Control | 6.00 | 1,000 | <100 | 10,000 | 500 |
| Treated | 0.05 | <100 | <100 | <100 | <100 |

*millions

When compared to the control, Table 1 shows a significant reduction in microbe counts. Further, there was no degradation of color, flavor or aroma.

While the invention has been described to understand and enable the practice thereof, it is to be understood that many alterations and modifications may be made to the invention as disclosed without departing from the spirit and scope of the invention. The presently referred to description, drawings and example are set forth for illustration and are not to be considered to limit the scope of the invention as set forth in the following claims.

The invention claimed is:
1. A dual bladder high pressure fluid processing system comprising:
   (a) a high pressure container capable of withstanding an internal pressure of from 30,000 psi to 150,000 psi, said container having an interior space;
   (b) a port in said container for introducing or removing a pressurizing fluid into or from said interior space;
   (c) open and closable pressure valve means controlling said port to allow the introduction of fluid into said interior space, to maintain said fluid under the internal pressure in said interior space and to allow the release of fluid pressure from said interior space;
   (d) dual first and second inflatable pressure resistant flexible bladders for containing fluids to be treated independently located in said interior space in a parallel relationship such that the first and second bladders are movably engageable with one another, each of the first and second bladder containing a fill line and drain line in fluid communication with said first and second bladder respectively; said lines extending through bladder ports in said container in a fluid tight manner, each of said fill and drain lines outside of said container being independently connected to a valve means to open and close each of said lines to allow introduction of treatment fluids and removal of treated fluids from each bladder; and

(e) a fluid reservoir and high pressure pump connected to allow introduction of fluid into said interior space through said pressure valve and port.

2. The system according to claim 1 wherein said high pressure pump can introduce and maintain said fluid in said interior space under pressures of between 30,000 and 150,000 psi for a period of time.

3. The system according to claim 2 wherein said fluid is maintained under pressure in said interior space under essentially ambient conditions.

4. The system according to claim 1 wherein when one bladder contains fluid to be treated the other bladder will be collapsed.

5. A method for reducing microbial content in treatment fluids comprising:
  (a) providing a dual bladder high pressure fluid processing system having:
    (i) a high pressure container capable of withstanding an internal pressure of from 30,000 psi to 150,000 psi, said container having an interior space;
    (ii) a port in said container for introducing or removing a pressurizing fluid into or from said interior space;
    (iii) open and closable pressure valve means controlling said port to allow the introduction of fluid under the internal pressure into said interior space, to maintain said fluid under the internal pressure in said interior space and to allow the release of fluid pressure from said interior space; and
    (iv) dual first and second inflatable pressure resistant flexible bladders for containing fluids to be treated independently located in said interior space in a parallel relationship such that the first and second bladders are movably engageable with one another, each of the first and second bladder containing a fill line and drain line in fluid communication with said first and second bladder respectively; said lines extending through bladder ports in said container in a fluid tight manner, each of said fill and drain lines outside of said container being independently connected to a valve means on each fill line and valve means on each drain line to open and close each of said lines to allow introduction of treatment fluids into, sealing of fluids within and removal of treated fluids out of each bladder;
  (b) introducing a treatment fluid into said first bladder through an open valve on the fill line with the valves on the drain line of the first bladder and fill and drain lines on the second bladder being closed;
  (c) closing said open valve on the fill line to seal said treatment fluid in said first bladder and introducing pressurizing fluid into said container through open pressure valve means and the port in said container until a pressure of 30,000 to 150,000 psi is reached and maintaining said pressure in said container for a period of time sufficient to reduce the microbial content of said treatment fluid in said first bladder into a treated fluid having reduced microbial content;
  (d) opening the valve on the drain line of said first bladder to allow treated fluid to drain from said first bladder while reducing the pressure of said pressurizing fluid in said container and opening the fill line valve of said second bladder and introducing a treatment fluid into said second bladder through said second fill line with the valve on the fill line of the first bladder being closed, the valve on the drain line of the second bladder being closed and the valve on the drain line of the first bladder being closed when the treatment fluid in said first bladder has been drained;
  (e) closing said open valve on the fill line to seal said treatment fluid in said second bladder and introducing pressurizing fluid into said container through open pressure valve means and the port in said container until a pressure of 30,000 to 150,000 psi is reached and maintaining said pressure in said container for a period of time sufficient to reduce the microbial content of said treatment fluid in said second bladder into a treated fluid having reduced microbial content;
  (f) opening the valve on the drain line of said second bladder to allow treated fluid to drain from said second bladder while reducing the pressure of said pressurizing fluid in said container and opening the fill line valve of said first bladder and introducing a treatment fluid into said first bladder through said first fill line with the valve on the drain line of the first bladder being closed, the valve on the fill line of the second bladder being closed, and the valve on the drain line of the second bladder being closed when the treatment fluid in said second bladder has been drained; and
  (g) repeating steps (b) through (f) as warranted.

* * * * *